United States Patent
Kolbe et al.

[19]

[11] Patent Number: 6,050,652
[45] Date of Patent: Apr. 18, 2000

[54] PROCESS AND CIRCUIT FOR DAMPING VIBRATIONS IN A VEHICLE DRIVE SYSTEM

[75] Inventors: Alexander Kolbe, Gross-Zimmern; Klaus Honus, Frankfurt am Main, both of Germany

[73] Assignee: ITT Manufacturing Enterprises Inc., Wilmington, Del.

[21] Appl. No.: 08/913,400

[22] PCT Filed: Mar. 21, 1996

[86] PCT No.: PCT/EP96/01233

§ 371 Date: Dec. 16, 1997

§ 102(e) Date: Dec. 16, 1997

[87] PCT Pub. No.: WO96/31373

PCT Pub. Date: Oct. 10, 1996

[30] Foreign Application Priority Data

Apr. 5, 1995 [DE] Germany ............ 195 12 623

[51] Int. Cl.[7] ................................................ B60T 8/32
[52] U.S. Cl. .................. 303/112; 303/191; 303/195; 303/196
[58] Field of Search ............................ 303/191, 194, 303/195, 196, 112

[56] References Cited

U.S. PATENT DOCUMENTS

| | | | |
|---|---|---|---|
| 4,733,920 | 3/1988 | Pannbacker | 303/195 |
| 4,759,590 | 7/1988 | Uchida et al. | |
| 5,511,867 | 4/1996 | Luckevich et al. | |
| 5,556,174 | 9/1996 | Wiss et al. | 303/195 |
| 5,615,935 | 4/1997 | Beyer et al. | 303/194 |
| 5,727,856 | 3/1998 | Kost et al. | 303/195 |
| 5,868,474 | 2/1999 | Abe et al. | 303/140 |

FOREIGN PATENT DOCUMENTS

| | | |
|---|---|---|
| 262602 | 4/1988 | European Pat. Off. |
| 329071 | 8/1989 | European Pat. Off. |
| 363515 | 4/1990 | European Pat. Off. |
| 416100 | 3/1991 | European Pat. Off. |
| 3722049 | 2/1988 | Germany |
| 3809099 | 9/1989 | Germany |
| 3918735 | 12/1990 | Germany |
| 4433729 | 3/1995 | Germany |
| 4423577 | 8/1995 | Germany |
| 405077707 | 3/1993 | Japan .................. 303/194 |
| 2289097 | 11/1995 | United Kingdom |
| 90/0625 | 6/1990 | WIPO |

*Primary Examiner*—Matthew C. Graham
*Attorney, Agent, or Firm*—Rader, Fishman & Grauer PLLC

[57] ABSTRACT

For dampening vibrations in the drive system of a vehicle which is equipped with a control system (an anti-lock system, traction slip control system, etc.), torsional vibrations in the circumferential direction of the wheels are determined by evaluating the rotational behavior of the individual wheels. The torsional vibrations are dampened as a function of the amplitude and the phase positioning of the torsional vibrations by introducing braking pressure or by modulating the braking pressure introduced into the wheel brakes of the individual wheels for slip control.

12 Claims, 3 Drawing Sheets

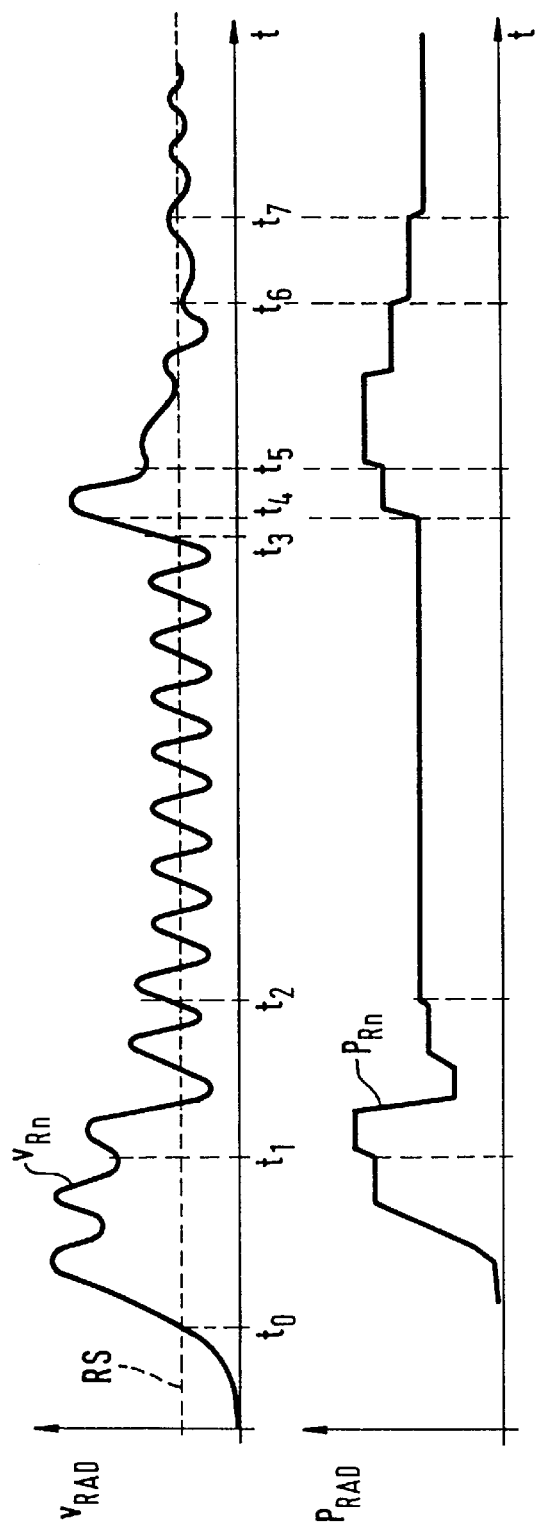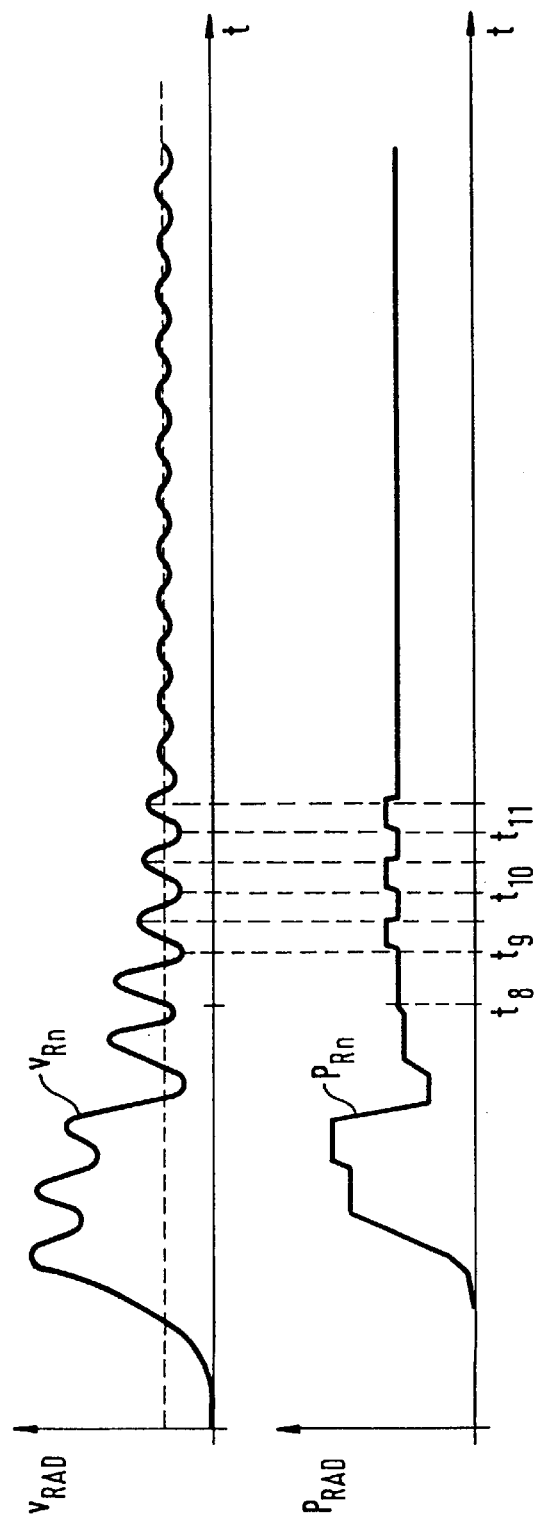

PROCESS AND CIRCUIT FOR DAMPING VIBRATIONS IN A VEHICLE DRIVE SYSTEM

BACKGROUND OF THE INVENTION

The present invention relates to a method of dampening vibrations in the drive system of a vehicle equipped with a control system, more particularly, an anti-lock system, traction slip control system, driving stability control system, or the like, wherein the rotational behavior of the individual wheels is sensed and analyzed. Circuitries for implementing the method are also comprised by the present invention.

Vibrations may occur in the drive system of an automotive vehicle due to elasticities in the drive trains, and take effect as torsional vibrations of the wheels in a circumferential direction, in particular of the driven wheels. Depending on their amplitude and frequency, these vibrations are felt in the vehicle and impair driving comfort. The vibrations may even be increased by control systems based on braking pressure modulation, in particular traction slip control systems and electronic differential locks.

An object of the present invention is to counteract vibrations and to dampen the vibrations at least to such an extent that they are not perceived by the driver and other occupants of the vehicle, and at least are not felt to be unpleasant.

SUMMARY OF THE INVENTION

It has been found that this object can be achieved by a method including that the vibrations in the drive system are determined by evaluation of the rotational behavior of the individual wheels and the torsional vibrations in a circumferential direction of the wheels, and that subsequently the vibrations are dampened by the introduction of braking pressure or by modulation of the braking pressure, which is introduced into the brakes of the individual wheels for slip control, as a function of the amplitude and the phase positioning of the torsional vibrations.

According to the present invention, the vibrations are effectively dampened by means of the component parts which are already provided in the control systems installed in a vehicle, without incurring additional expenditure, apart from the extension of the control electronics or the control program. This enhances the comfort and improves the control in many cases.

In one embodiment, the present invention is limited to a "passive" vibration dampening which is provided by delaying the pressure introduction into the wheel brakes of the respective wheel, which is responsive to slip control, until the commencement of the next leading half wave of the torsional vibration. Similarly, if necessary, the start of pressure reduction can be delayed until the commencement of the next trailing half wave of the torsional vibration. When the braking pressure is modulated by pressure-increase and pressure-reduction pulses in the control system, the start of the pressure-increase and pressure-reduction pulses is in each case postponed until the commencement of the next leading or trailing half wave for vibration dampening purposes.

Passive vibration dampening of this type fails when torsional vibrations appear as disturbing during a phase when the pressure is maintained constant. In this case, "active" vibration dampening is performed according to the present invention, irrespective of the braking pressure modulation calculated by the slip control system. Braking pressure is introduced into the wheel brake of the respective wheel at the beginning of a leading half wave of the torsional vibrations, and braking pressure is reduced accordingly at the beginning of a trailing half wave. Appropriately, the braking pressure is reduced by the amount by which it was previously increased.

In especially favorable circuitries for passive and active vibration dampening, a first nominal pressure component responsive to slip control and also a second nominal pressure component, which is used for passive or active dampening of the torsional vibrations and is produced by a vibration dampening logic circuit, are separately determined, superimposed and delegated, as a nominal value of the braking pressure, to a valve actuation control. The valve actuation control furnishes the signals to actuate the hydraulic valves. It can be sufficient for passive vibration dampening that the vibration dampening logic circuit issues an output signal which causes holding of the previously determined first nominal pressure component or relay of the current first nominal pressure component.

The valve control, in turn, can include a (subordinate) control loop which compares the nominal value of the braking pressure, which is determined by superposition of the two nominal value components, with the actual value of the braking pressure, determines the difference between the nominal value and the actual value of the braking pressure or an approximated actual value, and generates the signals for the actuation of the hydraulic valves as a function of this braking pressure difference. The pressure approximated to the actual value of the braking pressure in the individual wheel brakes is appropriately defined by producing a wheel pressure pattern.

The circuitries which are used to implement the method of the present invention can be realised by a hard-wired logic, or by correspondingly programmed microcomputers, microcontrollers, or the like.

Further features, advantages and possible applications of the present invention can be seen in the following description of embodiments, making reference to the accompanying drawings.

BRIEF DESCRIPTION OF THE DRAWINGS

In the drawings,

FIG. 3 is a diagram showing the variation of the wheel speed and the wheel braking pressure with passive vibration dampening.

FIG. 4 is a view identical to FIG. 3 of the variation of the wheel speed and the wheel braking pressure with active vibration dampening.

DETAILED DESCRIPTION OF THE DRAWINGS

Figure 1:
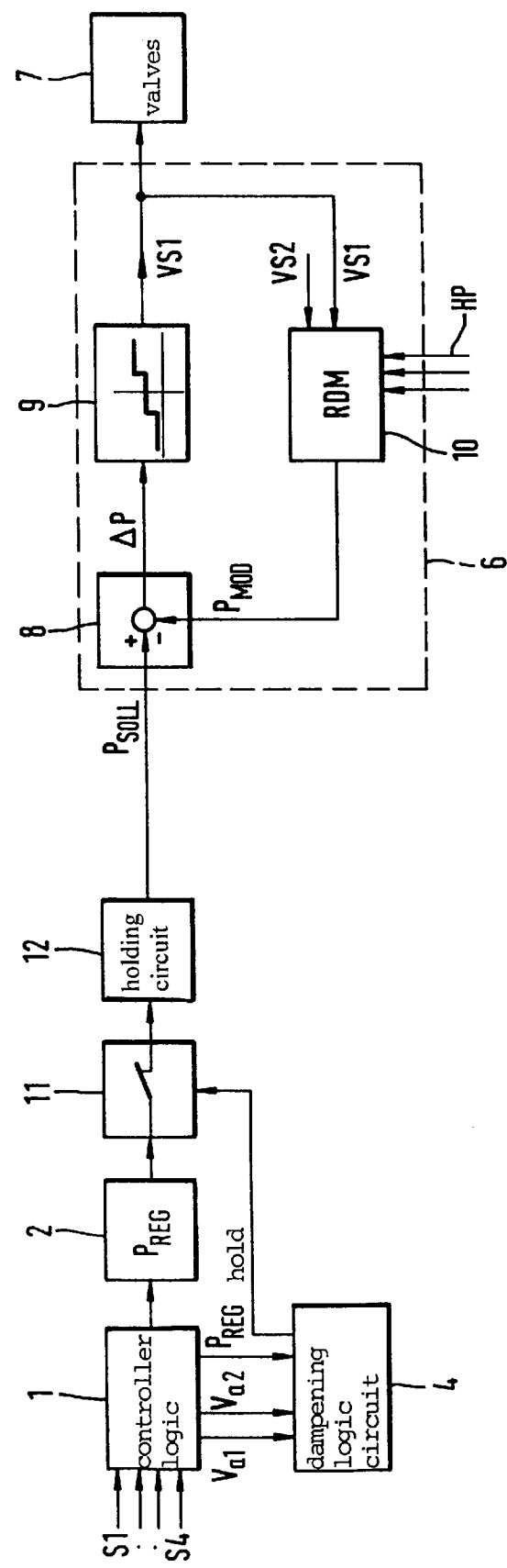
FIG. 1 is a block diagram of a circuitry of the present invention with pave vibration dampening exclusively.
Figure 2:
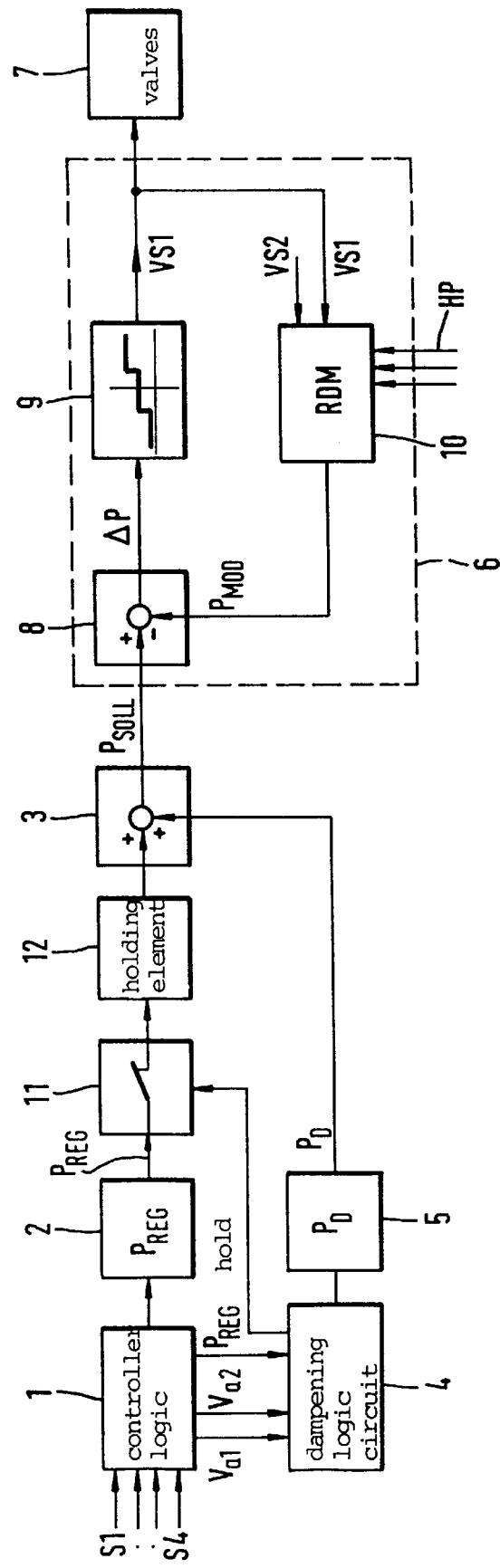
FIG. 2 is a view identical to FIG. 1 of a circuitry with passive and active vibration dampening.

FIGS. 1 and 2 illustrate the basic design of a circuitry of the present invention and explain the principal operation of the method of the present invention. This embodiment relates to a circuitry for a brake system with electronic anti-lock and traction slip control. The data about the rotational behavior of the individual wheels acquired by wheel sensors S1–S4 are analyzed in a known fashion in a controller logic 1, or in a data processing system which uses programmed circuits, such as microcomputers, and/or hard-wired electronic circuits. The behavior of the vehicle is also evaluated by way of the sensor signals. For example, a vehicle reference speed is determined which furnishes reference quantities to proportion the braking pressure in the wheel brakes of the individual, controlled wheels.

FIG. 1 shows a circuitry with exclusively passive vibration dampening. In a pressure-determining circuit 2, a nominal value $P_{REG}$ for the braking pressure in the individual wheel brakes responsive to slip control, is produced from the output signals of the controller logic 1, i.e., as a function of the rotational behavior of the individual wheels and on the basis of the control algorithms installed in the controller logic 1.

A pressure-holding circuit 11 and 12 is provided. As long as a vibration dampening logic circuit 4 does not intervene, the nominal value $P_{REG}$ is delegated to a valve actuation control 6 by way of the closed switch 11 and the holding loop 12 of the pressure-holding circuit.

A control loop connected downstream in a valve actuation control 6 is provided in the embodiments of the present invention shown in FIGS. 1 and 2. The control loop is used to determine the signals for the actuation of the valves 7 from the braking pressure nominal value $P_{SOLL}$.

In the valve actuation control 6, the nominal pressure $P_{SOLL}$ is compared with an actual pressure or a value $P_{MOD}$ approximated to the actual pressure in a subtractor 8. Subsequently, the signals VS1 for the actuation of the valves of the associated controlled wheel are calculated in a valve driver 9 from the difference $\Delta P = P_{SOLL} - P_{MOD}$.

The actual pressure or a value $P_{MOD}$ approximated to the actual pressure is produced by providing a so-called wheel pressure pattern RDM in a circuit 10 in the embodiments of the present invention to which FIG. 1 relates, and FIG. 2 which will be explained hereinbelow. In a circuitry on the basis of programmed circuits, the wheel pressure pattern RDM is produced by a corresponding programming. The valve actuation signals VS1 of the hydraulic valves associated with the respective wheel are mainly taken into account as input quantities for the wheel pressure pattern RDM. However, other signals, for example the actuation signals for other hydraulic valves, are used as well. This is represented by the signal line VS2.

In addition, other parameters are taken into account for producing the wheel pressure pattern RDM which shall furnish a value in approximation of the actual wheel braking pressure without direct pressure measurement. Except the valve actuation times, the pressure-increase and pressure-reduction characteristic curves of the wheel brakes, the characteristics and the on-periods of the hydraulic pump (HP), the initial pressure upon start of the control, the instantaneous control mode—ABS, TCS or DSC, etc., for example, are also important. The arrows pointing to the circuit 10 represent the parameters.

To dampen vibrations in the drive system, which cause torsional vibrations of the driven wheels in a circumferential direction, the rotations of the driven wheels are assessed in the additional circuit 4. To this end, the additional circuit 4 is provided with the already conditioned speed signals $v_{a1}$, $v_{a2}$ (representative of the speed of the driven wheels) by way of the indicated signal lines which lead from the controller logic 1 to the logic circuit 4.

An information about whether the controller logic 1 requests pressure increase or pressure reduction is necessary for the passive vibration dampening shown in FIG. 1.

When the vibration dampening logic circuit 4 has recognized that the pressure increase or pressure reduction instantaneously required from the traction slip control system shall be postponed, switch 11 opens. The last pressure demand prevalent before the switch 11 opens is constantly sent as a nominal value to the pressure control logic circuit 6 by way of the holding element 12.

FIG. 2 relates to an embodiment of a circuitry with active and passive dampening of vibrations in the drive system. In addition to the previously described circuitry, there is need for a circuit 5 which determines the nominal pressure component $P_D$ on the basis of the output signals of the additional circuit or vibration dampening logic circuit 4, and an adder 3. A second nominal pressure component $P_D$ is added to the nominal pressure or the first nominal pressure component $P_{REG}$ in the adder 3.

The output signal of the adder 3 caused by the superposition or the correct-phase addition of the two nominal pressure components $P_{REG}$ and $P_D$ is sent to the valve actuation control 6 (as in the embodiment of FIG. 1) that finally sends the signals to the control of the individual hydraulic valves 7 of the brake system, which includes the circuitries of FIG. 1 or FIG. 2. The braking pressure in the individual wheel brakes is thereby controlled.

Consequently, the nominal pressure component $P_D$ is responsive to the torsional vibrations of the driven wheels alone. The actual anti-lock or traction slip control which determines the operation of the controller logic 1 defines the braking pressure component $P_{REG}$. The nominal pressure $P_{SOLL}$ in the individual wheel brakes results from superposition of the two braking pressure components $P_{REG}$ and $P_D$.

The diagrams of FIGS. 3 and 4 illustrate the operation of the method according to the present invention and the circuitries according to the present invention. FIG. 3 shows an example of "passive" vibration dampening in the traction slip control mode. At time $t_0$, the speed $v_{Rn}$ of the wheel n of a starting vehicle exceeds the traction slip control threshold RS shown in dotted lines. Thus, braking pressure $P_{Rn}$ is introduced into the wheel brake of the respective wheel, as shows the pressure variation $P_{RAD}$ in FIG. 3. The braking pressure is used to reduce the wheel slip (which is a positive slip or traction slip herein) in a known fashion to such a degree that a phase of constant braking pressure follows starting from $t_2$ to $t_4$. At time $t_3$, the traction slip rises again in excess of a limit value, with the result of a reincrease of the wheel braking pressure in two steps (at times $t_4$ and $t_5$) and a subsequent pressure reduction (at times $t_6$ and $t_7$) until the constant pressure value.

As can be seen in FIG. 3, a wheel vibration having a relatively high frequency is superposed on the wheel speed $v_{Rn}$ which is influenced by slip control. With a passive vibration dampening to which FIG. 3 relates, torsional vibrations have no effect on the pressure variation in the wheel brake during the pressure hold-constant phase which starts at time $t_2$. Only at time $t_3$, when the slip-responsive control demands an increase in braking pressure, will the commencement of braking pressure increase be influenced in response to the phase positioning of the torsional vibrations. Pressure increase in the embodiment shown commences (at time $t_4$) only when the next leading half wave of the torsional vibration occurs. This becomes more apparent at time $t_5$. Pressure reduction is delayed in a corresponding fashion by vibration dampening according to the present invention until the commencement of the next trailing half wave of the torsional vibration, i.e., until times $t_6$ and $t_7$. This achieves dampening of the torsional vibration as can be seen in the variation of the wheel speed $v_{Rn}$ after time $t_6$.

In an "active" vibration dampening according to FIG. 4, the vibrations are dampened also in the actual pressure hold-constant phase during traction slip control. The hold-constant phase of the braking pressure initiated by the actual slip control starts at time $t_8$ in the embodiment of FIG. 4 because control is performed according to the averaged (filtered) slip. The torsional vibrations determined by the additional circuit 4, however, trigger braking pressure modulation already in this phase when the braking pressure component, responsive to slip control, is constant. The modulation causes braking pressure increases at times $t_9$, $t_{10}$, $t_{11}$ which start in each case at the beginning of a leading half wave of the torsional vibrations and which are succeeded by a corresponding braking pressure reduction at the beginning of the trailing half wave of the torsional vibrations. This provides an effective dampening of the torsional vibrations also in the actual braking pressure holding phase, when only looking upon the braking pressure responsive to slip control. This is shown by the wheel speed variation $v_{Rn}$ in FIG. 4.

Thus, in the "passive" vibration dampening described, the timing of the pressure-increase and pressure-reduction pulses calculated by the slip control counteracts the torsional vibrations by inversely phased brake torque variations. This means that whenever a pressure-increase pulse shall be issued by the slip control, the pulse is shifted until the commencement of the next leading half wave of the torsional vibration. A reduction pulse is shifted accordingly until the beginning of the next trailing half wave. However, vibration dampening is only achieved with this passive method when the slip control initiates variations of the wheel braking pressure. When no pressure variation occurs during long hold-constant phases (because the difference of the wheel slip from its nominal value predetermined by the control threshold is small, for example), a torsional vibration may develop (see FIG. 3) without being dampened by a pressure modulation.

In "active" vibration dampening operations, however, a pressure increase of a defined magnitude $P_D$ calculated in the circuit 5 in FIG. 1 or 2 is initiated irrespective of the braking pressure modulation (triggered by the slip control) at the start of the leading half wave of a torsional vibration, in case the latter exceeds a predefined intensity or a limit value. The purpose of the pressure increase is to brake the wheel when accelerating and to thereby dampen the torsional vibration. On the other hand, pressure is reduced at the beginning of the trailing half wave by the same amount by which the wheel re-accelerates inversely phased relative to the torsional vibration. Thus, a vibration-dampening effect is also achieved.

Appropriately, both measures, i.e. passive and active vibration dampening, are combined, with the result that the torsional vibrations are dampened during slip control operations to such an extent that they are not felt at all, or only to a small degree.

We claim:

1. A method of dampening vibrations in a drive system of a vehicle with slip control and equipped with a plurality of wheels, each having a wheel brake and a wheel speed sensor for sensing a rotational behavior of the wheel, and with a control system for analyzing the rotational behavior of the individual wheels, wherein vibrations in the drive system are determined by evaluation of the rotational behavior and of torsional vibrations of the individual wheels in a circumferential direction, and wherein the vibrations are dampened by modulation of braking pressure, which is introduced into the wheel brakes of the individual wheels, as a function of the amplitude and the phase of the torsional vibrations.

2. The method as claimed in claim 1 wherein, for passive vibration dampening, a commencement of pressure introduction into the wheel brake of a respective wheel, which is responsive to slip control, is delayed until the commencement of a next leading half wave of the torsional vibration of the respective wheel, which leading half wave corresponds to increasing rotational speed.

3. The method as claimed in claim 1, wherein a start of pressure reduction, responsive to slip control, is delayed until the commencement of a next trailing half wave of the torsional vibration.

4. The method as claimed in claim 1, for a control system wherein the braking pressure in the wheel brakes is controlled by pressure-increase and pressure-reduction pulses, wherein the start of the braking pressure-increase pulses is postponed until the commencement of a next leading half wave.

5. The method as claimed in claim 1, for a control system wherein the braking pressure in the wheel brakes is controlled by pressure-increase and pressure-reduction pulses, wherein the start of the braking pressure-reduction pulses is postponed until the commencement of a next trailing half wave for vibration dampening purposes.

6. The method as claimed in claim 1, wherein, for active vibration dampening, irrespective of a braking pressure modulation due to slip control, braking pressure is introduced into the wheel brake of the respective wheel at the beginning of a leading half wave of the torsional vibrations.

7. The method as claimed in claim 1, wherein, for active vibration dampening, irrespective of a braking pressure modulation due to slip control, braking pressure is reduced at the beginning of a trailing half wave.

8. The method as claimed in claim 1, wherein in successive leading and trailing half waves of the torsional vibrations, the braking pressure is respectively increased and reduced again by approximately the same amount.

9. A circuitry for implementing a method of dampening vibrations in a drive system of a vehicle with a brake system including pressure-operated wheel brakes, an electronic control, wheel sensors for determining the rotational behavior of the individual wheels, and an electronic circuit for evaluating the sensor signals and for generating braking pressure control signals which are sent to electrically operable hydraulic valves and are used to control the braking pressure in the wheel brakes as a function of the wheel rotational behavior, wherein there is provision of circuits which repeatedly determine a first nominal pressure component responsive to slip control, and additional circuits which furnish a signal representative of a second nominal pressure component for dampening torsional vibrations, and wherein an adder superposes the two nominal pressure components, produces a nominal value of the braking pressure and sends it to a valve actuation control which provides the signals for actuating the hydraulic valves.

10. The circuitry as claimed in claim 9, wherein the valve actuation control includes a subordinate control loop which compares the nominal value of the braking pressure a pressure value representative of an actual braking pressure, which determines the difference between the nominal value and the pressure value representative of the actual braking pressure, and generates signals for the actuation of the hydraulic valves as a function of the difference between the nominal value and the actual value.

11. The circuitry as claimed in claim 10, wherein the pressure value representative of the actual braking pressure in the individual wheel brakes is defined by producing a wheel pressure pattern.

12. A circuitry used for passive dampening of torsional vibrations in a drive system of a vehicle with a brake system including pressure-operated wheel brakes, an electronic control, wheel sensors for determining the rotational behavior of the individual wheels, and an electronic circuit for evaluating the sensor signals and for generating braking pressure control signals which are sent to electrically operable hydraulic valves and are used to control the braking pressure in the wheel brakes as a function of the wheel rotational behavior, wherein there is provision of circuits which repeatedly determine a first nominal pressure component responsive to slip control, and wherein the circuitry includes a vibration dampening logic circuit as an additional circuit generating an output signal, and wherein there is provided a pressure hold-constant circuit, comprising a switch and a holding circuit, which is actuatable by the output signal of the vibration dampening logic circuit and relays the most recently determined first nominal pressure component to the valve actuation control in response to the output signal of the vibration dampening logic circuit.

* * * * *